Patented July 30, 1946

2,404,787

UNITED STATES PATENT OFFICE 2,404,787

HYDROXY-DI-(DIHYDRONORDICYCLO-PENTADIENE)

Herman A. Bruson, Philadelphia, Pa., assignor to The Resinous Products & Chemical Company, Philadelphia, Pa., a corporation of Delaware No Drawing. Application March 14, 1944, Serial No. 526,484

5 Claims. (Cl. 260—617)

This invention relates to hydroxy-di-(dihydronordicyclopentadiene, a new polycyclic, unsaturated, secondary alcohol having the formula $C_{20}H_{25}OH$, and to a method for its preparation.

As described in copending application Serial No. 476,645, filed February 20, 1943, now Patent No. 2,385,788, dated October 2, 1945, the hydration of dicyclopentadiene by means of sulfuric acid and water yields an unsaturated polycyclic alcohol, $C_{10}H_{13}OH$, termed hydroxydihydronordicyclopentadiene, having the probable Formula A or B

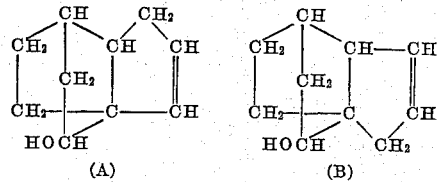

in which a rearrangement of the endomethylene cycle of the original dicyclopentadiene molecule has occurred. The group $C_{10}H_{13}$— represents the new dihydronordicyclopentadienyl group, the functional group (in this case—the hydroxyl group) being attached by a single valence to an endoethylene cyclopentano group which forms one terminal cycle of the dihydronordicyclopentadienyl group, while a five-membered ring containing an olefinic linkage forms the opposite cycle thereof.

The alcohol, hydroxydihydronordicyclopentadiene, may be considered as the acid-catalyzed addition-rearrangement product of water and dicyclopentadiene. This product has the general formula

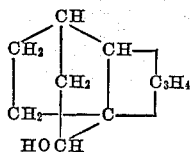

wherein $C_3H_4$ is a propenylene group which in conjunction with the adjoining carbon atoms forms a cyclopenteno group. It will be noted that the hydroxyl group is joined to a secondary carbon atom which is flanked on one side by a methylene group and on the other by a tertiary carbon atom.

According to this invention, the above alcohol is converted into hydroxy-di-(dihydronordicyclopentadiene), $C_{20}H_{25}OH$, by heating said alcohol with a strongly alkaline catalyst such as an alkali metal or an oxide, hydroxide or alcoholate thereof, such as lithium, sodium, potassium, sodium oxide, sodium hydroxide, potassium hydroxide, or sodium ethylate, at about 180°–250° C. for several hours during which time water is eliminated according to the equation:

$$2C_{10}H_{13}OH \rightarrow C_{20}H_{25}OH + H_2O$$

The amount of catalyst required can be varied, good results being obtained with from about 2% to 20% of catalyst on the weight of the alcohol used. The product, hydroxy-di-(dihydronordicyclopentadiene) contains two double bonds in its molecule and is resinous in character, probably because it consists of cis and trans stereoisomers. For this reason it is useful in plastics and coating compositions. Upon hydrogenation of its two double bonds by means of Raney nickel catalyst, it yields the corresponding saturated alcohol $C_{20}H_{29}OH$ as a colorless, hard, transparent glass.

The following examples illustrate the invention.

Example 1

A mixture consisting of 12 g. of metallic sodium and 300 g. of hydroxydihydronordicyclopentadiene was stirred and heated under a reflux condenser at 219–221° C. for six and one-half hours. The product was washed with hot water and distilled in vacuo. Unchanged hydroxydihydronordicyclopentadiene first distilled over, followed by the desired hydroxy-di-(dihydronordicyclopentadiene) which distilled at 185°–205° C./2.5 mm. as a very viscous, transparent balsam of almost water-white appearance. It solidified to a glassy mass.

Example 2

A mixture consisting of 450 g. of hydroxydihydronordicyclopentadiene and 56 g. of powdered potassium hydroxide was stirred and heated under reflux in a copper flask at 200° C. for six hours. The product was washed with hot water and the residual oil distilled in vacuo to give the same product as in Example 1.

Hydroxy-di-(dihydronordicyclopentadiene) as obtained above is readily soluble in benzene and other organic solvents. Its esters of carboxylic acids also are useful in plastics.

I claim:

1. As a new compound, hydroxy-di-(dihydronordicyclopentadiene), a secondary alcohol, having the formula $C_{20}H_{25}OH$, and possessing two double bonds in the molecule, said alcohol being the product formed by condensation of two molecules of hydroxydihydronordicyclopentadiene at 180°–250° C. in the presence of a strongly alkaline catalyst.

2. A method for making hydroxy-di-(dihydronordicyclopentadiene), $C_{20}H_{25}OH$, which comprises heating at 180° to 250° C. hydroxydihydronordicyclopentadiene, $C_{10}H_{13}OH$, the acid-catalyzed, addition-rearrangement product of water and dicyclopentadiene, in the presence of a strongly alkaline catalyst.

3. A method for making hydroxy-di-(dihydronordicyclopentadiene), $C_{20}H_{25}OH$, which comprises heating at 180° to 250° C. hydroxydihydronordicyclopentadiene, $C_{10}H_{13}OH$, the acid-catalyzed, addition-rearrangement product of water and dicyclopentadiene, in the presence of an alkali metal.

4. A method for making hydroxy-di-(dihydronordicyclopentadiene), $C_{20}H_{25}OH$, which comprises heating at 180° to 250° C. hydroxydihydronordicyclopentadiene, $C_{10}H_{13}OH$, the acid-catalyzed, addition-rearrangement product of water and dicyclopentadiene, in the presence of an alkali metal hydroxide.

5. A method for making hydroxy-di-(dihydronordicyclopentadiene), $C_{20}H_{25}OH$, which comprises heating at 180° to 250° C. hydroxydihydronordicyclopentadiene, $C_{10}H_{13}OH$, the acid-catalyzed, addition-rearrangement product of water and dicyclopentadiene, in the presence of an alkali metal alcoholate.

HERMAN A. BRUSON.